United States Patent [19]
Perriman et al.

[11] 3,997,911
[45] Dec. 14, 1976

[54] SCREENED IMAGE REPRODUCTION

[75] Inventors: Michael J. Perriman, Boreham Wood; Richard M. Gascoigne, Kingston-upon-Thames; Peter C. Pugsley, Pinner, all of England

[73] Assignee: Crosfield Electronics Limited, London, England

[22] Filed: Jan. 6, 1975

[21] Appl. No.: 538,580

[30] Foreign Application Priority Data

Jan. 7, 1974    United Kingdom ............... 700/74

[52] U.S. Cl. ............................ 358/75; 178/6.6 B; 178/6.7 R; 235/186
[51] Int. Cl.² ....................................... H04N 1/46
[58] Field of Search ............... 178/6.7 R, 6.6 B; 358/75

[56] References Cited
UNITED STATES PATENTS

| | | | |
|---|---|---|---|
| 3,657,472 | 4/1972 | Taudt | 178/6.6 B |
| 3,742,129 | 6/1973 | Roberts | 178/6.7 R |

Primary Examiner—Howard W. Britton
Attorney, Agent, or Firm—Toren, McGeady and Stanger

[57] ABSTRACT

In the reproduction of a half-tone image, $x$ and $y$ pulse trains are generated in synchronism with the production of image-representing signals resulting from scanning the image to be reproduced; the $x$ pulse train is multiplied in frequency by first and second factors and the $y$ pulse train by third and fourth factors, all factors being irrational or nearly irrational and being different functions of the screen angle selected for printing; the first and third pulse trains are accumulated and combined and the second and fourth pulse trains are separately accumulated and combined, the resulting signals being applied to a function generator which produces a predetermined screen pattern signal which is a periodic two-dimensional function of the position of the scanned image element in the two mutually perpendicular directions.

9 Claims, 10 Drawing Figures

SCREENED IMAGE REPRODUCTION

For making a half-tone reproduction of an image, it is known to produce the half-tone screen electronically, by using an exposing head having a number of light elements arranged in a row, the row of elements when all illuminated generating a line of light across the width of a scanning line on a light-sensitive medium to be exposed. The light elements are controlled by means of a common picture signal for that point of the scanning line and individual screen-representing signals, the latter signals being such as would be produced by scanning a vignetted contact screen at a resolution much finer than that of the scanning raster.

In the known systems, the angle of screen rotation is required to have a rational tangent, all dot centres lying on a grid consisting of a finite number of evenly spaced lines per unit length, and the ratio of separations of dot centres lying on the same grid line for a screen of one colour separation to that for another colour separation is rational, the grid lines being parallel or perpendicular to the direction of the scanning lines. In other words, it is required that the dot pattern resulting from the superposition of screens at different angles should precisely replicate over the whole picture in both directions. The restriction to the use of dot patterns satisfying this requirement results in an objectionable moire pattern when screened images are superimposed.

According to the present invention an image to be reproduced is scanned to derive electric signals corresponding to density or colour-component density values of successively scanned elements of the image, and screen-representing signals are derived by: generating $x$ and $y$ pulse trains in synchronism with the production of the image-representing signals resulting from the scanning in two respective mutually perpendicular directions of the image to be reproduced; generating first and second further pulse trains by multiplying the frequency of the $x$ pulse train by respective first and second factors and generating third and fourth further pulse trains by multiplying the frequency of the $y$ pulse train by third and fourth factors, the first, second, third and fourth factors being irrational or nearly irrational and being different functions of the screen angle selected for the printing; supplying the first and third pulse trains to first accumulating and combining means and the second and fourth pulse trains to second accumulating and combining means, each of the accumulating means being such that when the accumulated content exceeds a predetermined value, the predetermined value is subtracted from the accumulated output; applying the outputs of the accumulating and combining means to a function generator which produces a predetermined screen pattern signal which is a periodic two-dimensional function of the position of the scanned image element in the said wo mutually perpendicular directions, whereby a pattern having a screen angle whose tangent is irrational or nearly irrational may be obtained; and combining the said periodic signal with the image-representing signal, the resulting signal being applied to an output device for making a half-tone print.

By "nearly irrational" we mean a number which, if expressed in irreducible fractional form, would be such that either the numerator or the denominator would be a number exceeding 2, or both the numerator and the denominator would be numbers exceeding 20. Advantageously one or both numbers exceed 40.

In apparatus for carrying into effect such a method, a phase-locked loop may be used to derive the signals of modified frequency by multiplying the input frequency by $m/n$; this can be done by providing in the feedback loop a circuit for dividing by $m$ and providing in the output line a circuit for dividing by $n$.

In order that the invention may be better understood, examples of apparatus embodying the invention will now be described with reference to the accompanying drawings, in which.

Figure 1:
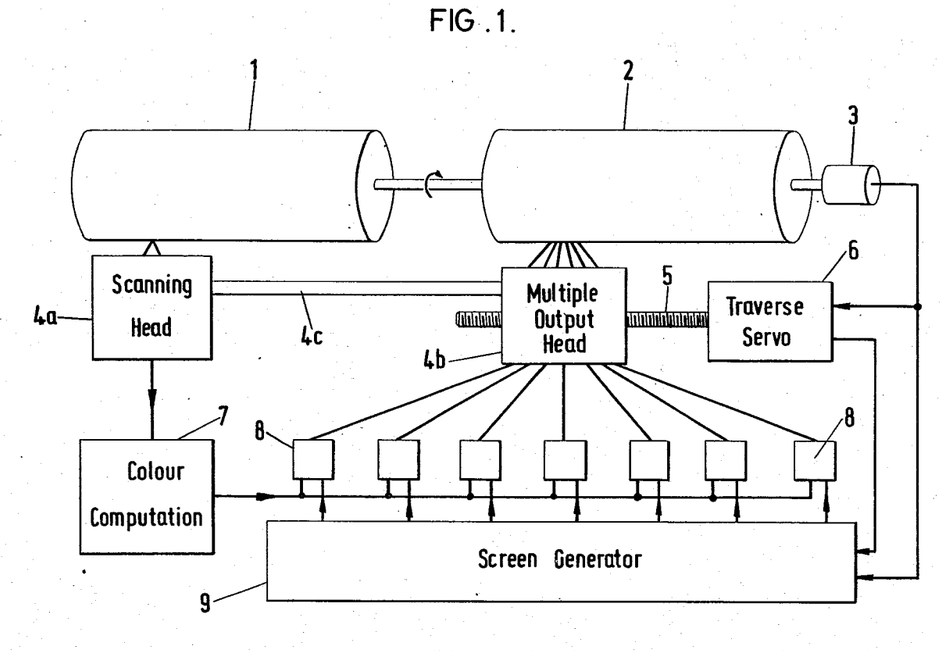
FIG. 1 shows diagrammatically apparatus which can be used to carry the invention into effect.

FIG. 1 is an overall block diagram showing an input drum 1, an output 2 and a shaft transducer 3 mounted on a common shaft. The input drum is scanned by a scanning analysing head 4a and the output drum 2 is scanned by a multiple-output exposing head 4b. These two heads are mechanically coupled through a member 4c and move together along a lead screw 5 controlled by a traverse servo 6. The traverse servo is in turn controlled by pulses from the shaft transducer 3. The output of the scanning head 4a is applied to a colour computation unit 7, in which corrections are introduced in a manner known in itself, the output of the circuit 7 going to each of a number of comparators 8. The comparators receive individual signals from a screen generator 9 and each comparator compares its individual screen signal with the common picture signal from circuit 7 and controls the corresponding output light source in head 4b accordingly. The manner in which the screen generator signals are formed will now be described.

Any screen pattern can be represented in a general way as $z = f(x, y)$, $F$ being a function periodic in both $x$ and $y$. An important class of such functions is the class of separable functions expressible as $z = f(x) \cdot f(y)$, $f$ being a periodic function.

One such function is the cosine function $$z = \cos 2\pi x \cdot \cos 2\pi y.$$

The above function will now be considered in more detail. Contours for this function are plotted in FIG. 2 of the accompanying drawings and will be seen to resemble conventional dot patterns very closely indeed.

Using standard trigonometrical identities this can also be expressed as $z = \frac{1}{2} \cos 2\pi(x + y) + \frac{1}{2} \cos 2\pi(x - y)$ a form which is also convenient for synthesis.

Rotation of the above pattern is achieved by the usual substitution:

$$z = f(x \cos \theta - y \sin \theta) \cdot f(x \sin \theta + y \cos \theta)$$

which, in the case of this cosine function gives $$z = \tfrac{1}{2} \cos [2\pi x (\cos \theta + \sin \theta) + 2\pi y (\cos \theta - \sin \theta)]$$
$$+ \tfrac{1}{2} \cos [2\pi x (\sin \theta - \cos \theta) + 2\pi y (\sin \theta + \cos \theta)]$$

Figure 2:
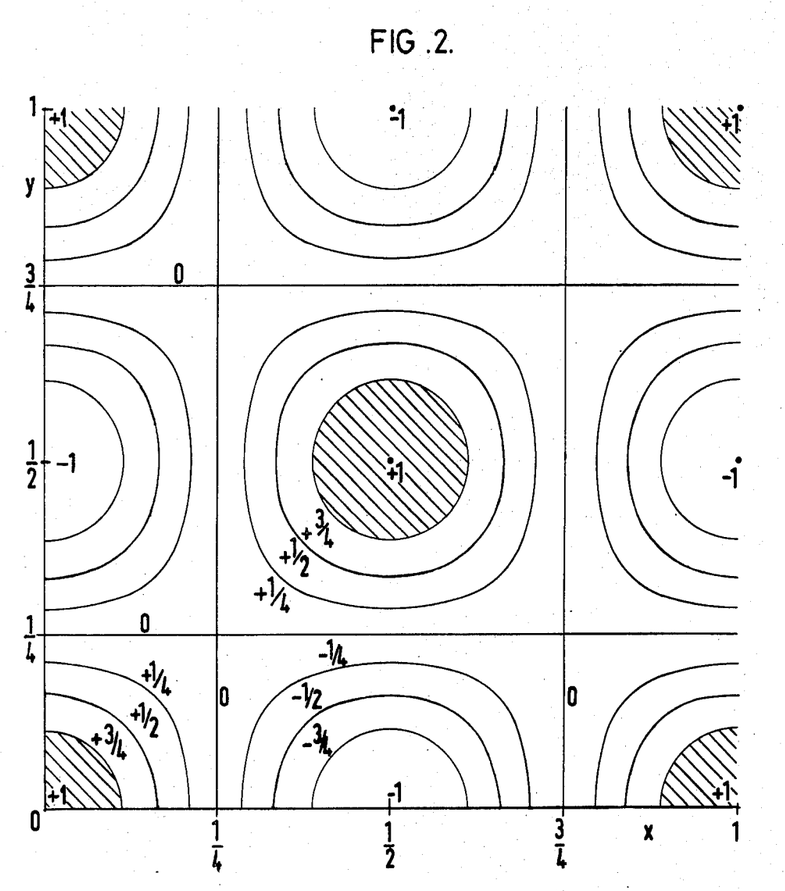
FIG. 2 illustrates a screen pattern which can be produced by apparatus embodying the invention.

The pattern as drawn in FIG. 2 would be described in conventional terms as that of a 45° screen, and hence the angle $\theta$ in the expression above differs by 45° from the equivalent conventional angle.

Figure 3:
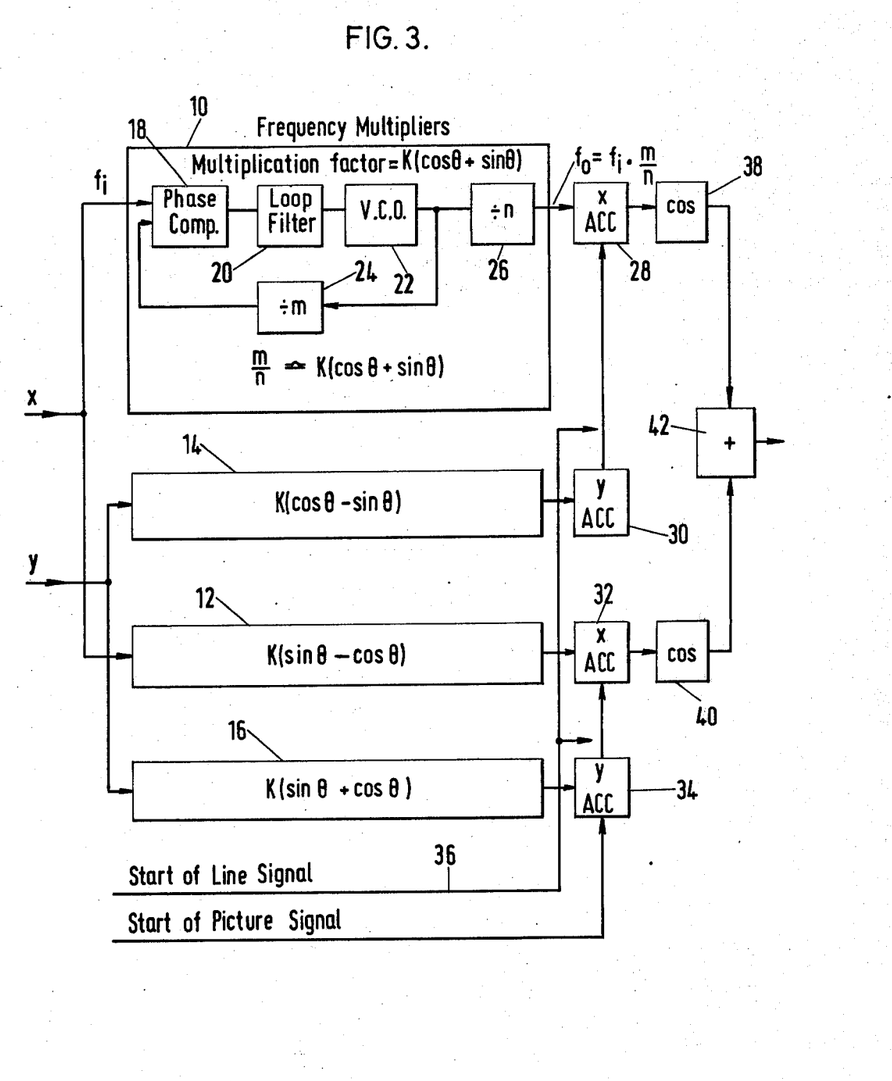
FIG. 3 illustrates computing apparatus for generating a signal representing the screen pattern of FIG. 2.

A basic block diagram of apparatus which can be used to compute this function is shown in FIG. 3 of the accompanying drawings. The direction along the scanning lines is taken as $x$ and the direction transverse to the scanning lines as $y$. FIG. 3 shows the apparatus for generating a signal for control of a single element of the output heads; the replication of the circuit for a multi-element head is self-evident. The apparatus of FIG. 3 is operated by a stream of $x$ and $y$ pulses. The $x$ pulse stream is generated by an incremental transducer attached to the drum shaft. The $y$ pulse stream is similarly generated in synchronism with the traverse motion of the output head, which is usually also controlled by the shaft transducer.

In FIG. 3, the $x$ pulses are applied to phase-locked loop circuits 10 and 12 and the $y$ pulses to phase-locked loop circuits 14 and 16. The circuit 10 generates the function $k(\cos \theta + \sin \theta)$; the other circuits 12 to 16 generate the functions stated in the boxes.

It will be appreciated that in any particular piece of apparatus only a limited number of screen angles $\theta$ will be required. Consequently for each of the screen angles the values of the trigonometrical expressions shown in brackets can be stored as a closely approximating fraction which is nearly irrational. Thus, in the block 10 the fraction $m/n$ is approximately equal to $K(\cos \theta + \sin \theta)$, where $K$ is a scale factor. The output frequency from the circuit 10 equals the input frequency multiplied by $m/n$.

In the circuit 10, the $x$ input pulses are applied to a phase comparator 18, which also receives a loop feedback signal, as will be described. The phase comparator output is applied through a loop filter 20, necessary for stabilisation of the loop, to a voltage controlled oscillator 22. The output of the voltage controlled oscillator is fed back to the second input of the phase comparator 18 through a pulse dividing circuit 24, which divides the feedback signal by $m$. This is a well known technique for multiplying the input frequency by the factor $m$, so that in practice the output of the oscillator 22 has a frequency $m$ times the input frequency to the circuit. The output of the oscillator is applied through a further division circuit 26 which divides the pulse frequency by $n$.

Similar circuits exist in the blocks 12, 14 and 16.

By the use of L.S.I. programmable counters, $m$ and $n$ may conveniently be made quite large, e.g., hundreds or thousands, without excessive cost. This permits a close approximation to any desired trigonometrical ratios. K is a scaling factor to suit system parameters. The trigonometrical function outputs are scaled so that one cycle of screen pattern is represented by a convenient number of pulses, e.g., $2^8$.

The trigonometrical function outputs are accumulated in four accumulators 28, 30, 32 and 34 which are in the example of 8 bits capacity. During the first drum rotation the "$\cos \theta + \sin \theta$" count is accumulated in the upper $x$ accumulator and fed in parallel digital form to the cosine generator. At the start of the next line the $x$ accumulator is cleared by means of a signal on line 36 and the count in the $y$ accumulator transferred into it without clearing the latter. The two lower accumulators function similarly.

The two $x$ accumulators thus contain at any instant the values of $$|[2\pi x(\cos \theta + \sin \theta) + 2\pi y(\cos \theta - \sin \theta)]| \text{ and}$$

$$|[2\pi x(\sin \theta - \cos \theta) + 2\pi y(\sin \theta + \cos \theta)]|$$

corresponding to the current $x$ value and the $y$ value as it was at the start of the current scanning line. This is a sufficient approximation to the current $x$, $y$ values. It does not take account of the helix angle of the scanning lines upon the output drum, but as the resulting distortion is common to all screens produced by the system it does not affect their relative geometry.

Figure 4:
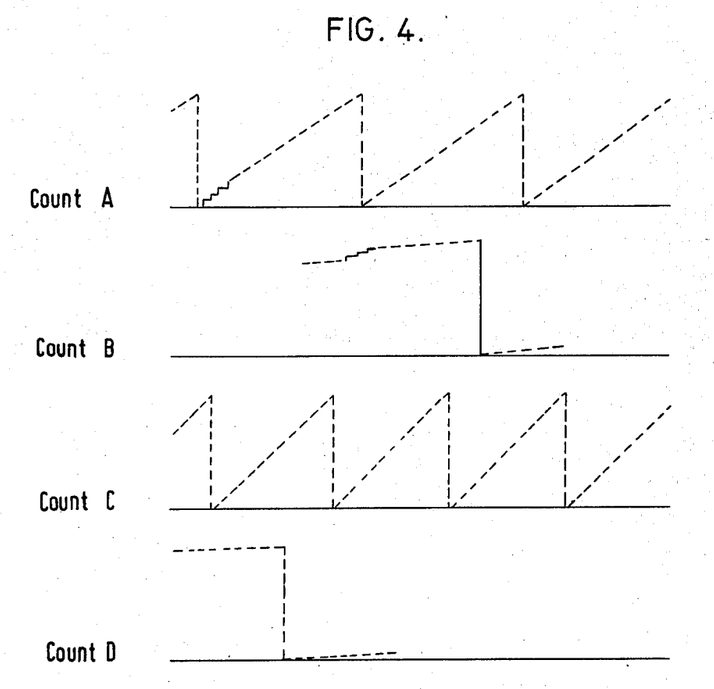
FIG. 4 shows waveforms illustrating the outputs of elements of FIG. 3.

The nature of the counts at the outputs of the four accumulators is illustrated by the diagrams A, B, C and D of FIG. 4. It must be emphasised that the counts shown (which are not to scale) represent the counts of the accumulators independently. In fact, counts A and C do not exist independently because the output of accumulator 28 represents A + B and the output of accumulator 32 represents C + D. As shown in full line for counts A and B, these counts increase in a series of small steps up to a peak and then decrease to zero in sawtooth form. The frequencies of the sawtooth count waveform are not rational functions of the input frequencies $x$ and $y$. Each count is entirely independent of the others in phase and in frequency, although the counts derived from the $y$ signal are of a much lower sawtooth frequency than those derived from the $x$ or line-scanning pulse train.

To derive the above-mentioned dot function, the counts in accumulators 28 and 32 are applied to cosine generating circuits 38 and 40 respectively. Only the modulus of the functions at the output of circuits 28 and 32 is required, since the subsequent operation of taking the cosine is not sensitive to the sign of its input. The $x$ and $y$ inputs to one pair of accumulators may be of opposite sign, and it is then necessary to add additional logic (not shown) to transfer the complement of the $y$ accumulator contents into the $x$ accumulator.

The cosine function generators may be of any convenient form accepting parallel digital input and having an analogue voltage (or current) output. A read-only memory followed by a digital-to-analogue converter is suitable. Alternatively a triangular function may be generated by a digital-to-analogue converter driven by suitable logic, the output being shaped to sinusoidal form by conventional non-linear circuits.

The outputs are added by an analogue summing circuit 42 to give the desired screen signal output.

It should be noted that the capacity of each accumulator is chosen to correspond with one cycle of the cosine generators. Since the cosine is a periodic function, overflow from the accumulators can be ignored without error.

It will be seen that the input signals $x$ and $y$ are pulse trains and the outputs of the phase-locked loops are pulse trains modified in frequency. The accumulator outputs are parallel digital outputs and the outputs of the cosine-generating circuits are analogue in form.

The values obtained by computing the above-mentioned function for given values of $x$ and $y$ can be seen from FIG. 2. For example, for $x = \frac{1}{2}$ and $y = \frac{1}{2}$, the value obtained is 1. For $x = \frac{1}{4}$ or $y = \frac{1}{4}$, whatever the value of $y$ and $x$ respectively, a zero value is obtained. The value obtained is compared with the incoming picture signal on line 20 (FIG. 3) and if the resultant of combining the functions exceeds the picture signal, then a signal is applied over line 22 to illuminate the exposing light source. For example, if the picture signal has a value of $\frac{3}{4}$, then the exposing light source will be illuminated when the $x$ and $y$ values define spots lying within the shaded areas of FIG. 2.

As stated above, the circuit of FIG. 3 is repeated for each of the elements of the output head of FIG. 1.

Other functions which may be used are as follows (these functions have not be normalised):

1. the product $XY$; $X = |[F_1(\cos \theta + \sin \theta) + F_2(\cos \theta - \sin \theta)]|$ and $Y = |[F_1(\sin \theta - \cos \theta) + F_2(\sin \theta + \cos \theta)]|$, where $F_1$, $F_2$ are periodic functions (e.g., $2\pi x$, $2\pi y$ respectively)
2. the function, $T [2 - \frac{1}{2} |T|]$, where $T=X+Y$
3. a function not simply expressible in mathematical form but which can be stored in a Read-Only-Memory.

The first of these functions easy to implement in hardware but has a poor curve for print density against signal level. The second function gives a precisely linear graph for print density against signal level, all dots being squares. The third of the above suggestions may utilise any one of a number of functions, of which one produces rectangular dots. The cosine function used in FIGS. 2 and 4 gives dots of very good shape but is more complex to implement in hardware than the product $XY$.

Figure 5:
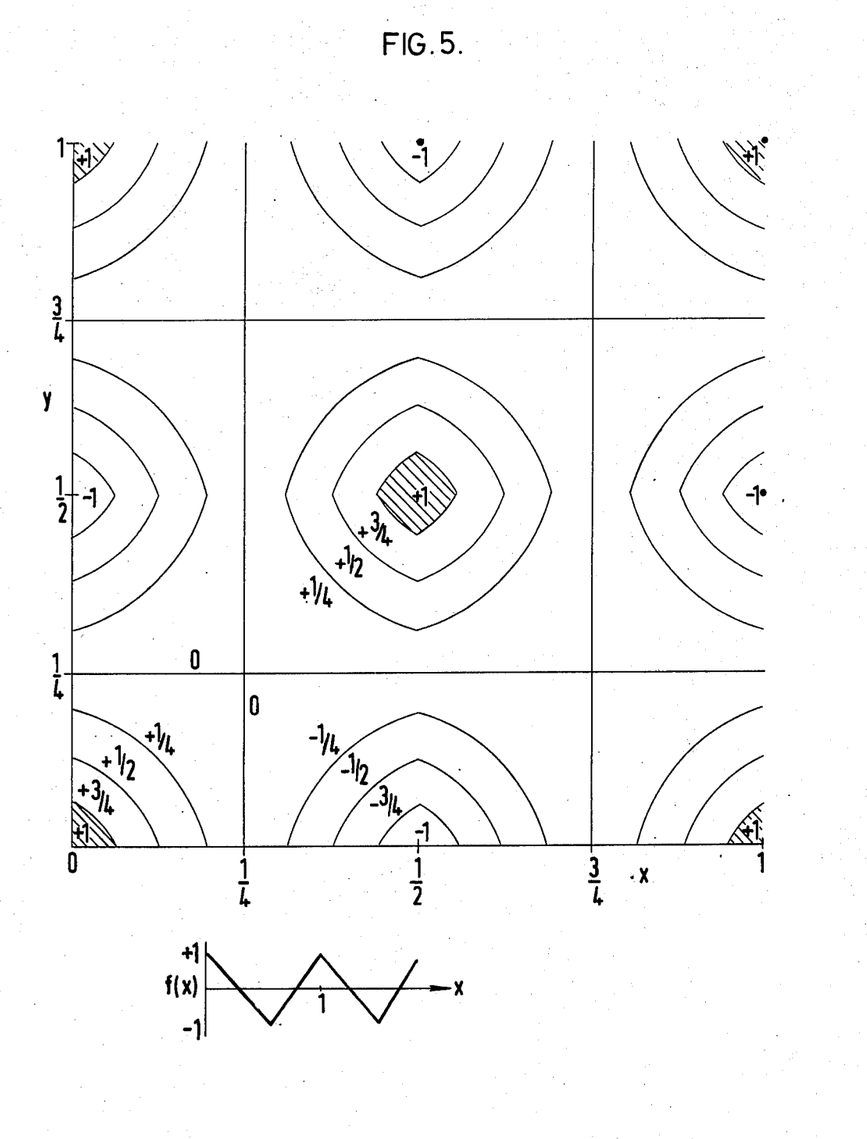
FIG. 5 shows a further screen pattern.

An example of the product function $XY$ is the triangular function $f(X) = 1 - 4|X|$ for $|X| \leq \frac{1}{2}$, for which the period is 1. Contours of $f(X).f(Y)$ for this function are plotted in FIG. 5 and will be seen to give a good approximation to conventional dot patterns except for the square shapes of the smaller dots. This is not a material objection.

Figure 6:
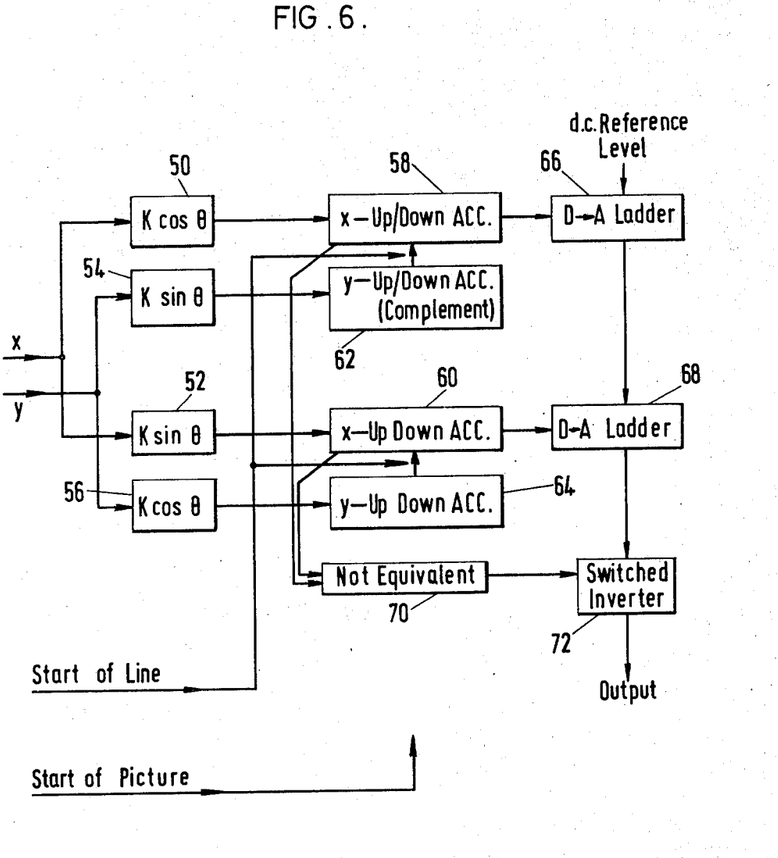
FIG. 6 shows apparatus for generating an electric signal representative of the screen pattern of FIG. 5.

FIG. 6 shows an incremental system for generating the triangular-waveform function. Its operation is similar to that described for the cosine function except for the following.

Figure 7:
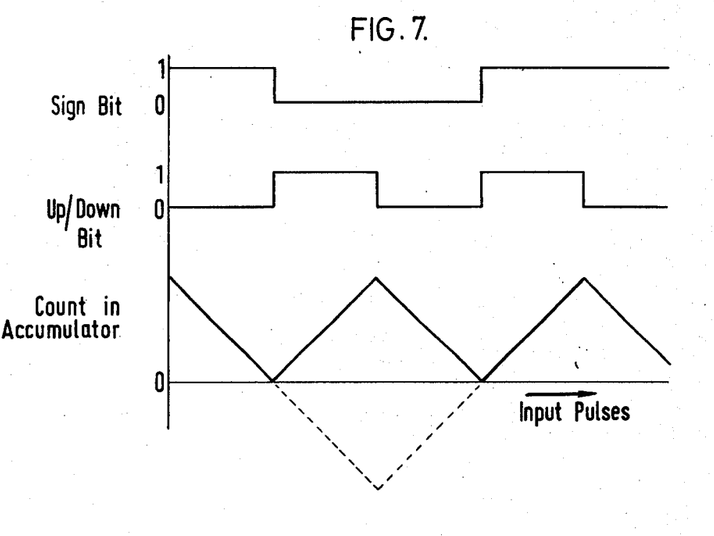
FIG. 7 is a diagram illustrating the operation of the apparatus of FIG. 6.

In FIG. 6, the $x$ pulse train is applied to phase-locked loop circuits 50 and 52 which multiply the pulse train frequency by $K \cos \theta$ and $K \sin \theta$ respectively. The $y$ pulse train is applied to phase-locked loop circuits which multiply the pulse train frequency by $K \sin \theta$ and $K \cos \theta$ respectively. The pulse trains from the circuits 50, 52, 54 and 56 are applied respectively to accumulators 58, 60, 62 and 64. In FIG. 6, these accumulators operate as up-down counters with additional up/down and sign bits as shown in FIG. 7. On multiplying the accumulator count by +1 or −1 according to the sign bit, one obtains the desired triangular wave. Both up-down bits and sign bits, as well as the count, are transferred from the $y$ to the $x$ accumulator at the start of each line.

The $x$ accumulators directly drive digital-to-analogue ladder converters 66 and 68. Each digital-to-analogue ladder converter multiplies the reference level applied to it by the digital input to provide an output signal representing their product. The above-mentioned product dot function is obtained by feeding the analogue output of the first ladder circuit 66 to the second ladder circuit 68 as a reference voltage.

The polarity of the output is obtained by comparing the sign bits in accumulators 58 and 60 in a comparator 70 and, when these are not equivalent, rendering effective an inverter circuit 72.

As shown by FIG. 7, the up/down bits determine whether the accumulator counts upwards or downwards. If the sign bit is zero, the inverter 72 becomes operative and the corresponding portions of the triangular waveform, shown in solid line, are effectively replaced by the dotted line triangular portions.

It will be appreciated that the frequencies used are high compared with the "dot" frequency in order to permit approximation to the irrational ratio by the ratio of the large integers.

As an example consider the uppermost signal path of FIG. 3 for a system with the following specification.

| | |
|---|---|
| $x$ - input scale | 1024 pulses per cm. |
| Output screen ruling | 60 lines/cm (defined in conventional manner, i.e., 45° direction in FIG. 2) |
| Screen angles required | $0°(\theta = 45°)$ |
| | $75°(\theta = 30°)$ |
| Cosine generator input scaling: | count of 256 per output cycle |

Figure 8:
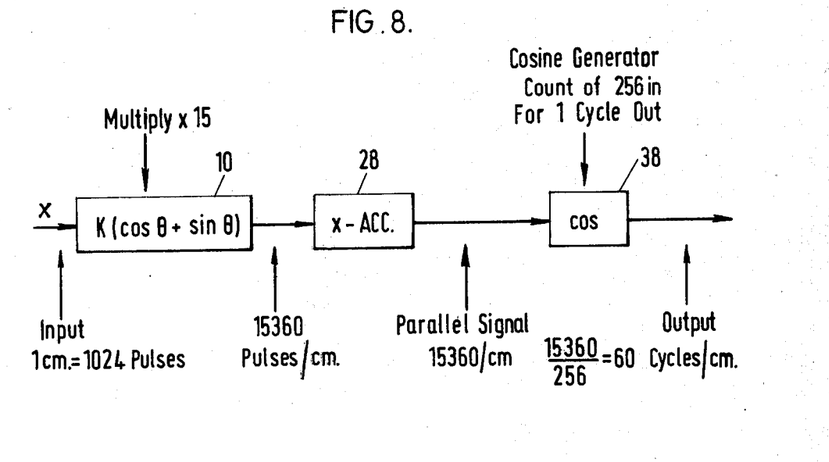
FIG. 8 illustrates the operation of a part of the apparatus of FIG. 3 for a specified set of conditions.

FIG. 8 shows the situation for $\theta = 45°$, for which $\cos \theta + \sin \theta = \sqrt{2}$. In this case the trigonometrical block must multiply by 15 times, and the scaling constant K has the value $(15/ \sqrt{2})$ At $\theta = 30°$ the required multiplying factor for the trigonometrical block is $$K (\cos 30° + \sin 30°) = \frac{15}{\sqrt{2}} \left( \frac{\sqrt{3}}{2} + \frac{1}{2} \right)$$

$$= \frac{15 (\sqrt{3} + 1)}{2\sqrt{2}}$$

$$= 14.4888874$$

An extremely close approximation to this can be realised by the ratio $$\frac{652}{45} = 14.48888889$$

The error is about 1 part in $10^7$.

The systems described above can be modified to produce screen patterns at angles having true irrational tangents by modifying the trigonometric multiplying blocks in the following manner.

A frequency-shifting block is inserted into the input or output path of the trigonometric block or inside the block itself which is capable of shifting the signal frequency a small amount by adding an arbitrary frequency to it. The arbitrary frequency is generated by a means not locked to the rotating drum and having an arbitrary and when desired irrational relation to it. Three means of generating the arbitrary frequency are possible.

a. Independent low-frequency oscillator b. Rotary phase-shifter driven by independent speed-controlled motor c. Rotary phase-shifter driven from output drum by friction drive.

In (a) and (b) it is necessary to maintain constant both the output drum speed and the speed of an auxiliary oscillator or motor. The accuracy required is not high however since the trigonometric block generates approximately the correct ratio and the auxiliary signal performs merely a small correction. In (c) the relative speeds are automatically maintained by the friction drive such as a belt drive, but it is necessary to change the drive ratio when changing the screen angle.

Figure 9:
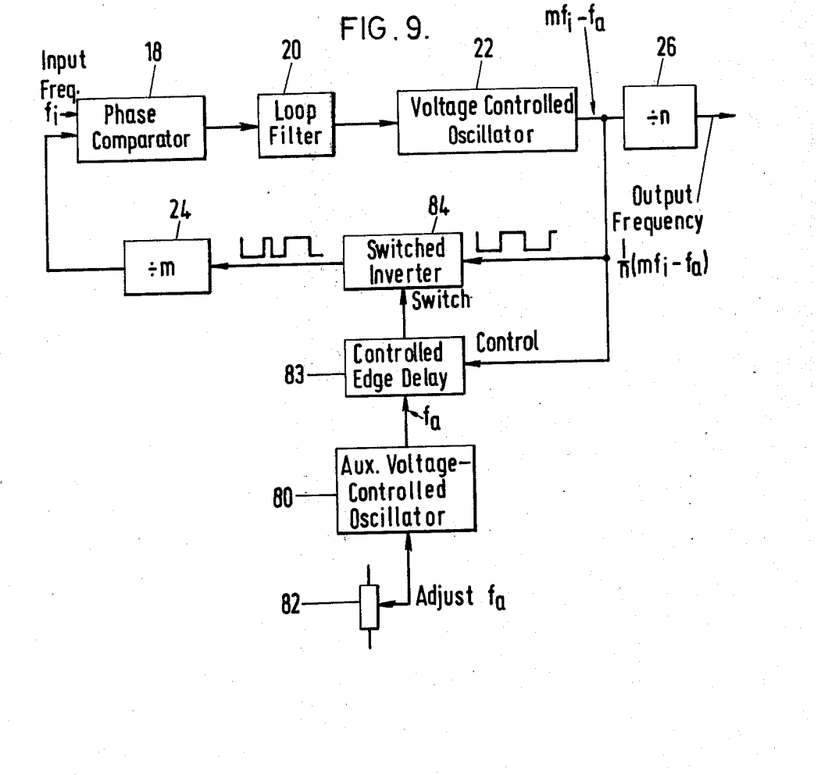
FIG. 9 illustrates the injection of an auxiliary oscillator into the phase-locked loop frequency multiplier.

FIG. 9 shows a circuit embodying method (a) above. An auxiliary voltage-controlled oscillator 80 receives a controlling signal from a potentiometer 82 and applies a signal of frequency $f_a$ to a circuit 83 which receives the output of the voltage-controlled oscillator 22 as a control signal and acts as a controlled edge-delay to switch an inverter 84. The delay circuit 83 is necessary to delay any transition in the auxiliary voltage-controlled oscillator output which happens to occur so close to a transition in the main voltage-controlled oscillator output that it would otherwise be lost. In this way, additional signals are injected into the feedback loop, with the result that the output of the voltage-controlled oscillator 22 is $mF_i - F_a$. The circuit 26 divides this frequency by $n$.

Another class of screen functions can be produced by summing periodic $X$ and $Y$ functions thus $z = f(X) + f(Y)$.

Figure 10:
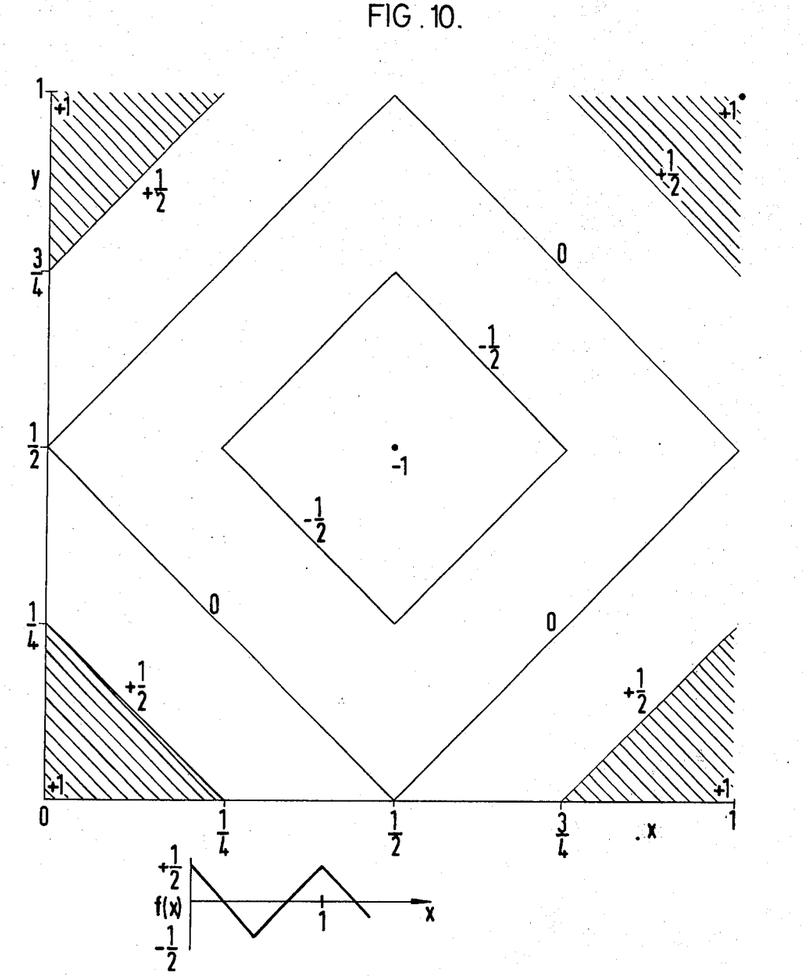
FIG. 10 illustrates yet another screen pattern.

The resulting contours are plotted in FIG. 10 using the same triangular-wave function as before. This also produces an acceptable family of dot shapes. Note that in this case a zero-angle screen is formed without rotation.

The block diagram of a synthesiser for this function will be exactly as FIG. 6 except that the two analogue-to-digital ladders will be replaced by a single ladder fed from the two x-accumulators via a parallel digital adder.

It will be appreciated that the signals derived from the scanner may be placed in store and extracted from store at a later time when the screen signals are generated.

We claim:

1. A method of reproducing images by half tone printing, in which an image to be reproduced is scanned to derive electric signals corresponding to density or colour-component density values of successively scanned elements of the image, and screen-representing signals are derived by generating $x$ and $y$ pulse trains in synchronism with the production of the image-representing signals resulting from the scanning in two respective mutually perpendicular directions of the image to be produced, generating first and second further pulse trains by multiplying the frequency of the $x$ pulse train by respective first and second factors and generating third and fourth further pulse trains by multiplying the frequency of the $y$ pulse train by third and fourth factors, the first, second, third and fourth factors being irrational or nearly irrational and being different functions of the screen angle selected for the printing; supplying the first and third pulse trains to first accumulating and combining means and the second and fourth pulse trains to second accumulating and combining means, each of the accumulating means being such that when the accumulated content exceeds a predetermined value, the predetermined value is subtracted from the accumulated output; applying the outputs of the accumulating and combining means to a function generator which produces a predetermined screen pattern signal which is a periodic two-dimensional function of the position of the scanned image element in the said two mutually perpendicular directions, whereby a pattern having a screen angle whose tangent is irrational or nearly irrational may be obtained, and combining the said periodic signal with the image-representing signal, the resulting signal being applied to an output device for making a half-tone print.

2. A method in accordance with claim 1, wherein the periodic two-dimensional function is of the form $z = \frac{1}{2} \cos [2\pi x (\cos \theta + \sin \theta) + 2\pi y (\cos \theta - \sin \theta)]$
$+ \frac{1}{2} \cos [2\pi x (\sin \theta - \cos \theta) + 2\pi y (\sin \theta + \cos \theta)]$.

3. A method in accordance with claim 1, wherein the periodic two-dimensional function is of the form $z = XY$ where $X = |[2\pi x(\cos \theta + \sin \theta) + 2\pi y(\cos \theta - \sin \theta)]|$ and $Y = |[2\pi x(\sin \theta - \cos \theta) + 2\pi y(\sin \theta + \cos \theta)]|$.

4. A method in accordance with claim 1, wherein the periodic two-dimensional function is $z = T[2 - \frac{1}{2}|T|]$, where $T =$ $|[2\pi x(\cos \theta + \sin \theta) + 2\pi y(\cos \theta - \sin \theta)]| +$
$|[2\pi x(\sin \theta - \cos \theta) + 2\pi y(\sin \theta + \cos \theta)]|$.

5. Apparatus for reproducing images by half tone printing, comprising means for deriving image-representing signals of the kind obtained by scanning an image to be reproduced and corresponding to density or colour-component density values of elements of the image, and further means for deriving screen-representing signals of the kind obtained by scanning a vignetted contact screen, the further means comprising: pulse-generating means for generating $x$ and $y$ pulse trains in synchronism with the scanning in two respective mutually perpendicular directions of the image to be reproduced; first and second multiplying means for generating first and second further pulse trains by multiplying the frequency of the $x$ pulse train by respective first and second factors; third and fourth multiplying means for generating third and fourth further pulse trains by multiplying the frequency of the $y$ pulse train by third and fourth factors, the first, second, third and fourth factors being all different and being irrational or nearly irrational functions of a desired screen angle; first accumulating and combining means receiving the first and third pulse trains; second accumulating and combining means receiving the second and fourth pulse trains, the accumulating and combining means being such that when the accumulated content exceeds a predetermined value, the predetermined value is subtracted from the accumulated output; function generating means receiving the outputs of the accumulating and combining means and producing a predetermined screen pattern signal which is a periodic two-dimensional function of the position, in the said two mutually perpendicular directions, of the screen element corresponding to the scanned image element; and means for combining the said periodic signal with the image-representing signal to obtain a resulting signal suitable for application to an output device for making a halftone print.

6. Apparatus in accordance with claim 5, in which each multiplying means includes a phase-locked loop including in its feedback circuit a frequency divider for dividing by the numerator of a fraction and in its output circuit, after the feedback signal has been derived, a frequency divider for dividing by the denominator of the fraction, the said fraction representing the irrational or nearly irrational function of the desired screen angle.

7. Apparatus in accordance with claim 5, further including means for generating a signal unrelated to the scanning frequencies and means responsive to the said signal to shift the frequency of the $x$ pulse tran or the $y$ pulse train or a signal associated therewith, whereby the said multiplying factors are truly irrational functions of the desired screen angle.

8. Apparatus in accordance with claim 6, including means for generating a signal of a frequency unrelated to the scanning frequencies and means responsive to the said signal to modify the signal in the feedback circuit of the phase-locked loop, whereby the said multiplying factors are truly irrational functions of the desired screen angle.

9. Apparatus in accordance with claim 8, in which the means for generating the said signal of unrelated frequency is a voltage-controlled oscillator receiving a preset voltage.

* * * * *